United States Patent [19]

Kim

[11] Patent Number: 4,995,079

[45] Date of Patent: Feb. 19, 1991

[54] CANAL+ DECODER SWITCHING CIRCUIT FOR VIDEO CASSETTE RECORDERS

[75] Inventor: Jin K. Kim, Seoul, Rep. of Korea

[73] Assignee: SamSung Electronics Co., Ltd., Suweon, Rep. of Korea

[21] Appl. No.: 390,193

[22] Filed: Aug. 7, 1989

[51] Int. Cl.$^5$ .......................................... H04N 7/167
[52] U.S. Cl. ..................................................... 380/20
[58] Field of Search ................... 358/147, 349; 380/20

[56]  References Cited

U.S. PATENT DOCUMENTS

| 4,731,837 | 3/1988 | Gautier | 380/14 |
| 4,817,142 | 3/1989 | Rassel | 380/15 |
| 4,916,736 | 4/1990 | Ryan | 380/14 |
| 4,924,498 | 5/1990 | Farmer et al. | 380/15 |
| 4,945,564 | 7/1990 | Christian et al. | 380/14 |

Primary Examiner—Thomas H. Tarcza
Assistant Examiner—David Cain
Attorney, Agent, or Firm—Robert E. Bushnell

[57]  ABSTRACT

A canal+ decoder switching circuit for video cassette recorders which can enable a canal+ decoder for receiving a canal+ broadcast to be automatically switched to a VCR or to a TV when VCR mode or TV mode is selected respectively. The circuit includes a switch control circuit proving four kinds of control signals by combining a control signal output from the canal+ decoder, a canal+ channel designation signal and a VCR/TV mode switching signal provided by a microcomputer. The circuit also includes four kinds of switches and the states of their contacts are determined by the control signals provided by the switch control circuit respectively so that the canal+ broadcast can be televiewed not only in VCR mode but in TV mode without the necessity of manual connection of the canal+ decoder.

4 Claims, 2 Drawing Sheets

CANAL+ DECODER SWITCHING CIRCUIT FOR VIDEO CASSETTE RECORDERS

BACKGROUND OF THE INVENTION

1. Field of the Invention

The present invention relates to a canal+decoder switching circuit for video cassette recorders, and more particularly to a canal+decoder switching circuit for VCRs for receiving SECAM (sequential technique and memory storage) system broadcasts, which enables a canal+decoder for receiving a canal+broadcast signal to be used not only in VCR mode but also in television (TV) mode.

2. Description of the Prior Art

In the SECAM system broadcasts, the canal+broadcast signal is dissimilar to a mormal broadcast signal. The canal+broadcast signal is transmitted in such a way that each video signal for each successive line has different phase delay with each other and is converted into a normal broadcast signal by the canal+decoder in a receiver in order to obtain a clean picture.

As the cannal+decoder is provided with secret codes, TV stations makes such secret codes known to the general televiewers who possess canal+decoders every month and the televiewer who is ignorant of such secret codes is unable to catch the canal+broadcast because the decoder fails to achieve exact decoding. Thus, a canal+decoder is positiely necessary to receive canal+broadcasts successfully.

In the conventional VCRs for receiving the canal+-broadcasts, an exclusive jack is provided so that the canal+decoder is connected thereto. Thus, when a canal+broadcast channel is selected, the output of the demodulator of the VCR is connected to the input of the canal+decoder and the canal+decoder converts the demodulated canal+signal into the normal signal. At this time, the canal+decoder outputs a high ievel signal through its control signal output only when the canal+signal is perfectly converted into the normal signal and then the converted signal is provided to the video signal processing circuit of the VCR in response to the control signal of high level, resulting in that the canal+broadcast signal can be received in VCR mode.

On the other hand, if the canal+decoder is connected to a TV, the canal+broadcast signal can be received in TV mode in the same manner as described above.

However, in the conventional VCR associated with the TV, the canal+decoder is usually connected only to the VTR. Thus, it is unable to obtain a normal picture when the televiewer intends to receive the canal+-broadcast in TV mode. Although it is possible to obtain a normal picture when the canal+decoder is separated from the VCR and connected directly to the TV, such work is troublesome and inconvenient.

SUMMARY OF THE INVENTION

It is an object of the present invention to provide a canal+decoder switching circuit which can afford facility for the use of a VCR by enabling a canal+decoder connected to the VCR to be automatically switched to a TV through the VCR when TV mode is selected without the necessity of manual connection of the canal+decoder.

In accordance with the present invention, there is provided a canal+decoder switching circuit for VCRs comprising: switch control means providing first, second, third and fourth control signals by combining a control signal provided by the canal+decoder, a canal+channel designation signal and a VCR/TV mode switching signal provided by a system control circuit respectively, first switch connecting the input of the canal+decorder to the output of a demodulator of the VCR or to the output of a demodulator of a TV in dependence upon the first control signal, second switch connecting the tuner signal input of an input selection switch to the output of the demodulator of the VCR or to the output of the canal+decoder in dependence upon the second control signal, third switch connecting the VCR signal input of a VCR/TV mode selection switch to the output of a video signal processing circuit of the VCR or to the output of the canal+decoder in dependence upon the third control signal, and the VCR/TV mode selection switch connecting the input of a video signal processing circuit of the TV to the output of the demodulator of the TV or to the output of the third switch in dependence upon the fourth control signal.

BRIEF DESCRIPTION OF THE DRAWINGS

The present invention will now be described by way of illustrative example with reference to the accompanying drawings, in which.

DETAILED DESCRIPTION OF THE PREFERRED EMBODIMENT

Figure 1:
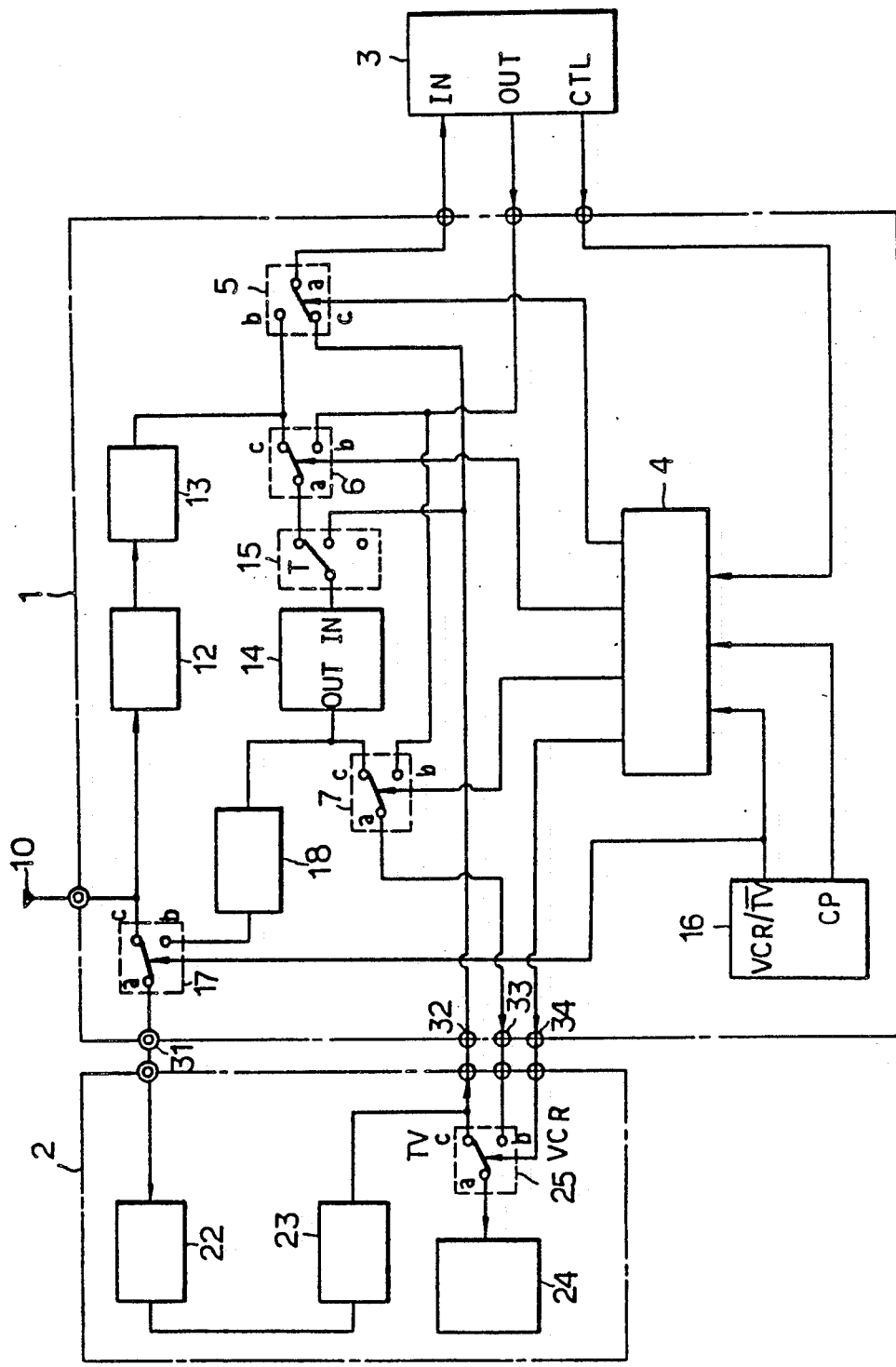
FIG. 1 is a block diagram of the embodiment of the present invention.

Referring to FIG. 1, a tuner 22 in a TV section 2 is connected to an RF output terminal 31 of a VCR section 1. A demodulator 23 in the TV section 2 is connected to the TV signal input of a VCR/TV mode selection switch 25 in the TV section 2 and a video input terminal 32 of the VCR section 1 whereas the VCR signal input of the VCR/TV mode selection switch 25 is connected to a video output terminal 33 of the VCR section 1.

The RF output terminal 31 is connected to a TV antenna 10 or to a modulator 18 by means of an antenna selection switch 17 in the VCR section 1, and the antenna 10 is also connected to the input of a tuner 12 in the VCR section 1, the output of which is connected to the input of a demoulator 13 in the VCR section 1. The tuner signal input T of an input selection switch 15, the output of which is connected to the input of a video signal processing circuit 14 in the VCR section 1, is connected to the output of the demodulator 13 or to the output of a canal+decoder 3 by means of a second switch 6. The input of the canal+decoder 3 is connected to the output of the demodulator 13 in the VCR section 1 by means of first switch 5. The video output terminal 33 is connected to the output of the video signal processing circuit 14 or to the output of the canal+decoder 3 by means of third switch 7.

The respective inputs of a switch control circuit 4 in the VCR section 1 are connected to the control signal output CTL of the canal+decoder 13, the VCR/TV mode selection signal output VCR/$\overline{\text{TV}}$ and the canal+channel designation signal output·CP of a system control means such as a microcomputer 16 respectively and the first, second, third and fourth control signal outputs thereof are connected to the control inputs of the first, second, third and VCR/TV mode selection switches 5, 6, 7 and 25 respectively.

The control signal output CTL of the canal+decoder 3 goes high only when a canal+broadcast signal input to the canal+decoder 3 is successively converted into a mormal broadcast signal. The microcomputer 16 outputs the canal+channel designation signal of high level when the selected channel is the predetermined canal+channel and the logic level of the VCR/TV mode selection signal becomes high in VCR mode whereas it becomes low in TV mode.

Figure 2:
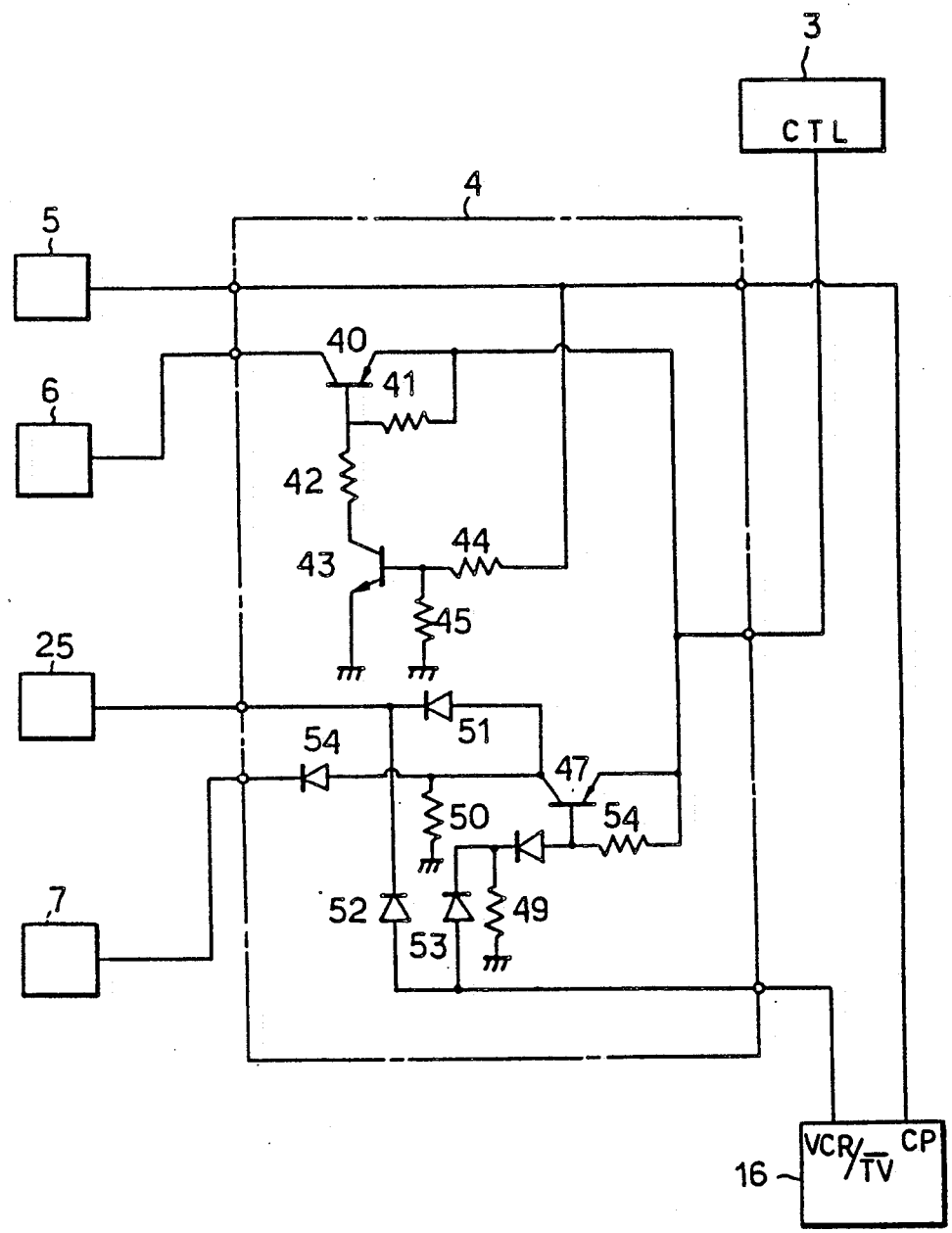
FIG. 2 a circuit diagram of the switch control circuit in FIG. 1.

Referring to FIG. 2 showing a desirable embodiment of the switch control circuit 4, the high level canal+-channel designation signal output from the microcomputer 16 is provided to the first switch 5 as the first control signal and to the base of a transistor 43, causing the transistors 43 and 40 to be turned on. Thus the control signal output from the canal+decoder 3 is provided to the second switch 6 as the second control signal.

In VCR mode, VCR/TV mode selection signal of high level is provided to the VCR/TV mode selection switch 25 through a diode 52. In TV mode, the VCR/TV mode selection signal goes low, causing a transistor 47 to be turned on and thus the control signal output from the canal+decoder 3 is provided to the third swith 7 and the VCR/TV mode selection switch 25 as the third and fourth control signals respectively through diodes 51 and 54.

Now, the operation and effect of the embodiment of the present invention will be described in detail with reference to the following table:

TABLE

| Mode Broadcast | VCR Mode | | | TV Mode | |
| --- | --- | --- | --- | --- | --- |
| | general broad-case | canal+ broad-cast | normal canal+ broad-cast | canal+ broad-cast | general broad-cast |
| Signal | | | | | |
| canal+ channel designation signal | L | H | H | L | L |
| control signal of canal+ decoder | L | H | L | H | L |
| first switch contacts | a-c(L) | a-b(H) | a-b(H) | a-c(L) | a-c(L) |
| second switch contacts | a-c(L) | a-b(H) | a-c(L) | a-c(L) | a-c(L) |
| third switch contacts | a-c(L) | a-c(L) | a-c(L) | a-b(H) | a-c(L) |
| VCR/TV mode selection switch contacts | a-b(H) | a-b(H) | a-b(H) | a-b(H) | a-c(L) |
| Antenna selection switch contacts | a-b(H) | a-b(H) | a-b(H) | a-c(L) | a-c(L) |

(The characters in the parentheses indicate respective logic levels of the switch control signals.)

In the above table, the level of the canal+channel designation signal CP goes low when the general broadcast is selected in VCR mode, and thus the first control signal also goes low as described above, causing the contacts a and c of the first switch 5 are connected. Also, as the control signal of the canal+decoder 3 goes low, the transistors 40 and 43 are turned off and the second control signal which is the collector output of the transistor 40 goes low, causing the contacts a and c of the second switch 6 are connected. Thus, the general broadcast signal being received by the antenna 10 is provided to the video signal processing circuit 14 through the tuner signal input T of the input selection switch 15.

On the other hand, as the VCR/TV mode selection signal goes high and the control signal of the canal+decoder 3 gose low, the transistor 47 is turned off and the third control signal which is the collector output of the transistor 47 goes low. Thus, the contacts a and c of the third switch 7 are connected and the output of the video signal processing circuit 14 is provided to the video output terminal 33. At this moment, the fourth control signal output from the switch control circuit 4, which is the VCR/TV mode selection signal of high level, is provided to the VCR/TV mode selection switch 25 through a diode 52 and thus the contacts a and c of the VCR/TV mode selection switch 25 are connected, causing the video signal provdide to the video output terminal 33 is applied to the video signal processing circuit 24 in the TV section 2.

Also, when the canal+broadcast channel is selected by the tuner 12 in VCR mode, the canal+channel designation signal CP goes high as shown in the table. Accordingly, the first control signal also goes high and the cantacts a and b of the first switch are connected, causing the canal+broadcast signal received through the tuner 12 and the demodulator 13 to be provided to the canal+decoder 3. As described above, the canal+decoder 3 converts the received canal+broadcast signal into the normal broadcast signal.

At this moment, the control signal of the canal+decoder 3 goes high and the transistors 40 and 43 are turned on by the canal+channel designation signal of high level. Thus, the second control signal of high level, which is the collector output of the transistor 40 is provided to the second switch 6 and the contacts a and b of the second switch 6 are connected.

As a result, the canal+broadcast signal which has been converted into the normal broadcast signal by the canal+decoder 3 is provided to the video signal processing circuit 14 through the contacts a and b of the second switch 6 and the tuner input T of the input selection switch 15. The levels of the third and fourth control signals are the same as when the general broadcast is selected.

When a normal canal+broadcast is received in VCR mode, the contacts a and b of the first switch 5 are connected as when the canal+broadcast is received as described above and the received broadcast signal is provided to the canal+decoder 3. However, as there is no signal being converted by the canal+decoder 3, the control signal thereof becomes low and accordingly, the states of the contacts for each switch are determined in the same manner as when the general broadcast is received.

On the other hand, when the canal+broadcast is received in TV mode, the canal+channel designation signal becomes low and the contacts a and c of the first switch 5 are connected, causing the input of the canal+decoder 3 to be connected to the output of the demodulator 23 in the TV section. In this case, the broadcast channel being selected in the VCR section 1 must not be the canal+broadcast channel.

While the canal+broadcast signal demodulated by the demodulator 23 in the TV section 2 is provided to the canal+decoder 3 to be converted into the normal canal+broadcast signal, the control signal of the canal+decoder 3 goes high and is provided to the switch control circuit 4.

In this case, the transistors 43 and 40 are turned off by the canal+channel designation signal of low level, and thus the second control signal of low level is provided to the second switch 6, causing the contacts a and c thereof to be connected. Also, the transistor 47 is turned on as the VCR/TV mode selection signal output from the canal+decoder goes low and the fourth control signal of high level, which is the collector output of the transistor 47, is provided to the VCR/TV mode selection switch 25 through the diode 51 as well as the third control signal of high level, which is also the collector output of the transistor 47, is provided to the third switch 7 through the diode 54. Thus, each contacts a and b of the VCR/TV mode selection switch 25 and the third switch 7 are connected respectively, causing the canal+broadcast signal converted by the canal+decoder is provided to the video signal processing circuit 24 in the TV section through the third and VCR/TV mode selection switches 7 and 25.

When the general broadcast is received in TV mode, the states of the contacts for the first, second and third switches 5, 6 and 7 are determined in the same manner as when the general broadcast is received in VCR mode, except that the contacts a and c of the VCR/TV moded selection switch 25 are connected by the VCR/TV mode selection signal of low level as can be shown in the table. Thus, the general broadcast signal received by the antenna 10 is provided to the video signal processing circuit 24 through the tuner 22 and the demodulator 23 in the TV section 2.

From the foregoing, it will be apparent that the present invention provides the advantage that the canal+broadcast can be televiewed not only in VCR mode but also in TV mode by switching the canal+decoder automatically, and thus the inconvenience caused by manually connecting the canal+decoder to the VCR or to the TV every time when receiving the canal+broadcast signal.

While the present invention has been described and illustrated herein with reference to the preferred embodiments thereof, it will be understood by those skilled in the art that various changes in form and details may be made therein without departing from the spirit and scope of the invention.

What is claimed is:

1. A canal+decoder switching circuit for VCRs having a canal+decoder for receiving a canal+broadcast comprising:

switch control means providing first, second, third and fourth control signals by combining a control signal provided by said canal+decoder, a canal+channel designation signal and a VCR/TV mode selection signal provided by a system control means respectively;

first switch connecting the input of said canal+decoder to the output of a demodulator of said VCR or to the output of a demodulator of a TV in dependence upon said first control signal;

second switch connecting the tuner signal input of an input selection switch to the output of said demodulator of said VCR or to the output of said canal+decoder in dependence upon said second control signal;

third switch connecting the VCR signal input of a VCR/TV mode selection switch to the output of a video signal processing circuit of said VCR or to the output of said canal+decoder in dependence upon said third control signal; and said VCR/TV mode selection switch connecting the input of a video signal processing circuit of said TV to the output of said demodulator of said TV or to the output of said third switch in dependence upon said fourth control signal.

2. The canal+decoder switching circuit of claim 1, wherein said switch control means includes first and second transistors which are operatively connected to each other and provide said control signal output from said canal+decoder as said second control signal in response to said canal+channel designation signal, said canal+channel designation signal being provided as said first control signal, third transitor which is turned on by said VCR/TV mode selection signal in TV mode and provides said control signal of said canal+decoder as said third and fourth control signals respectively, and a diode providing said VCR/TV mode selection signal as said fourth control signal in VCR mode.

3. A canal+decoder switching circuit for VCR, having a canal+decoder for receiving a canal+broadcast signal, comprising:

switch control means for providing first, second, third and fourth control signals by combining an input control signal provided by a canal+decoder, a canal+channel designation signal an a VCR/TV mode selection signal;

first switching means for connecting an input terminal of the canal+decoder to one of an output terminal of a demodulator of a VCR and an output terminal of a demodulator of a television receiver, in dependence upon said first control signal;

second switching means for connecting the tuner signal input of an input selection switch to one of the output terminal of the demodulator of the VCR and the output terminal of the canal+decoder, in dependence upon said second control signal;

third switching means for connecting a VCR signal input terminal of a VCR/TV mode selection switch to one of the output terminal of a video signal processing circuit of the VCR and the output terminal of said canal+decoder, in dependence upon said third control signal; and VCR/TV mode selection switching means for connecting the input terminal of a video signal processing circuit of the television receiver to one of the output terminal of the demodulator of the television receiver and output terminal of said third switching means, in dependence upon said fourth control signal.

4. The canal+decoder switching circuit of claim 1, wherein said switch control means includes:

first and second transistors operatively connected to each other and providing said control signal provided by said canal+decoder as said second control signal in response to said canal+channel designation signal, and providing said canal+channel designation signal as said first control signal, a third transistor turned on by said VCR/TV mode selection signal during a television mode to provide said input control signal of said canal+decoder as said third and fourth control signals respectively, and a diode providing said VCR/TV mode selection signal as said fourth control signal during a VCR mode.

* * * * *